(12) United States Patent
Suzuki et al.

(10) Patent No.: US 9,341,223 B2
(45) Date of Patent: May 17, 2016

(54) SPRING AND MANUFACTURE METHOD THEREOF

(75) Inventors: Takeshi Suzuki, Yokohama (JP); Yoshiki Ono, Yokohama (JP); Shimpei Kurokawa, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 310 days.

(21) Appl. No.: 14/002,798

(22) PCT Filed: Mar. 1, 2012

(86) PCT No.: PCT/JP2012/055277
§ 371 (c)(1),
(2), (4) Date: Sep. 23, 2013

(87) PCT Pub. No.: WO2005/081586
PCT Pub. Date: Sep. 1, 2005

(65) Prior Publication Data
US 2014/0008852 A1   Jan. 9, 2014

(30) Foreign Application Priority Data
Mar. 4, 2011 (JP) .................................. 2011-047175

(51) Int. Cl.
*F16F 1/06* (2006.01)
*F16F 1/02* (2006.01)
(Continued)

(52) U.S. Cl.
CPC . *F16F 1/021* (2013.01); *C21D 7/06* (2013.01); *C21D 9/02* (2013.01); *C22C 38/02* (2013.01);
(Continued)

(58) Field of Classification Search
CPC ..................................... F16F 1/04; F16F 1/06
USPC ............................................................ 267/166
See application file for complete search history.

(56) References Cited

U.S. PATENT DOCUMENTS 4,909,866 A    3/1990   Abe et al.
5,368,656 A *  11/1994  Heitmann ................ C21D 1/25
                                                         148/333

(Continued)

FOREIGN PATENT DOCUMENTS

CN        1768155 A       5/2006
EP        0 462 779 A2    12/1991
(Continued)

OTHER PUBLICATIONS

Jul. 28, 2014 Search Report issued in European Patent Application No. 12755633.0.

(Continued)

*Primary Examiner* — Robert A Siconolfi
*Assistant Examiner* — James Hsiao
(74) *Attorney, Agent, or Firm* — Oliff PLC

(57) ABSTRACT

A spring with superior fatigue resistance is provided by decreasing the material cost while simplifying the production process. Disclosed is a spring including: a composition consisting of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and impurities; a structure including not less than 95% of tempered martensitic structure; a compressive residual stress layer formed to a depth of 0.35 mm to D/4, in which D (mm) is a diameter; the compressive residual stress layer having maximum compressive residual stress of 800 to 2000 MPa; a center portion with Vickers hardness of 550 to 700 HV; and a high hardness layer with greater hardness than the center portion.

11 Claims, 1 Drawing Sheet

(51) Int. Cl.
  *C21D 7/06* (2006.01)
  *C21D 9/02* (2006.01)
  *C22C 38/02* (2006.01)
  *C22C 38/04* (2006.01)
  *C22C 38/18* (2006.01)
  *C22C 38/34* (2006.01)
  *B21F 35/00* (2006.01)

(52) U.S. Cl.
  CPC ............... *C22C 38/04* (2013.01); *C22C 38/18* (2013.01); *C22C 38/34* (2013.01); *B21F 35/00* (2013.01); *C21D 2211/008* (2013.01); *F16F 1/06* (2013.01); *Y10T 29/49609* (2015.01)

(56) References Cited

U.S. PATENT DOCUMENTS

| | | | | |
|---|---|---|---|---|
| 5,415,711 | A * | 5/1995 | Takagi | C22C 38/02 148/328 |
| 6,017,641 | A | 1/2000 | Aoki et al. | |
| 6,022,427 | A | 2/2000 | Wienand et al. | |
| 6,074,496 | A * | 6/2000 | Yarita | C21D 3/04 148/333 |
| 7,560,628 | B2 * | 7/2009 | Yamao | C21D 8/06 428/673 |
| 7,615,186 | B2 * | 11/2009 | Suda | C21D 8/06 148/333 |
| 2006/0201588 | A1 * | 9/2006 | Suda | C22C 38/02 148/333 |
| 2007/0267112 | A1 | 11/2007 | Yoshikawa et al. | |
| 2008/0128057 | A1 | 6/2008 | Hufnagel et al. | |
| 2010/0034691 | A1 * | 2/2010 | Yoshihara | C21D 8/06 420/91 |

FOREIGN PATENT DOCUMENTS

| | | |
|---|---|---|
| EP | 1 619 264 A1 | 1/2006 |
| JP | A 64-83644 | 3/1989 |
| JP | A 2-57637 | 2/1990 |
| JP | A-5-78748 | 3/1993 |
| JP | A-8-170152 | 7/1996 |
| JP | A 2004-346424 | 12/2004 |
| JP | A 2005-120479 | 5/2005 |
| JP | A 2007-138260 | 6/2007 |
| JP | A 2008-115468 | 5/2008 |
| JP | A 2008-163423 | 7/2008 |
| JP | A-2008-280612 | 11/2008 |
| JP | A 2009-52144 | 3/2009 |
| WO | 2004087978 A1 | 10/2004 |
| WO | WO 2005/081586 A1 | 9/2005 |

OTHER PUBLICATIONS

Jun. 5, 2012 Search Report issued in International Patent Application No. PCT/JP2012/055277 (with translation).
Dec. 12, 2014 Office Action issued in Chinese Patent Application No. 201280011669.X.

* cited by examiner

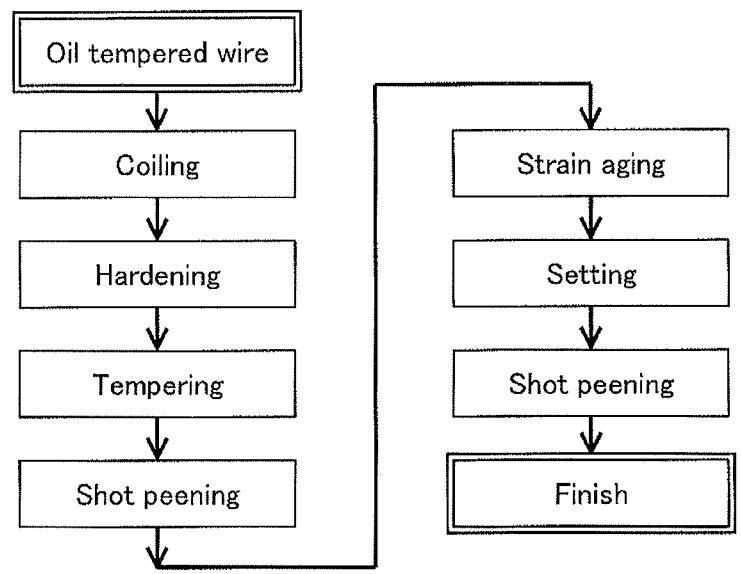

SPRING AND MANUFACTURE METHOD THEREOF

TECHNICAL FIELD

The present invention relates to a spring with superior fatigue resistance, and relates to a production method therefor.

BACKGROUND ART

For example, materials for valve springs for automobile engines may include oil tempered carbon steel wires (SWO-V), oil tempered chromium-vanadium steel wires (SWOCV-V), and oil tempered chromium-silicon steel wires (SWOSC-V), which are specified in the Japanese Industrial Standards (JIS). The oil tempered chromium-silicon steel wires are conventionally widely used in view of the fatigue resistance and the sag resistance. In recent years, reduction in weight of the valve spring is strongly desired in order to improve fuel efficiency of automobiles, and there is a trend of increasing tensile strength in spring wire so as to increase design stress of the valve spring. In a case of a spring wire such as an oil tempered wire specified in the JIS, notch sensitivity to cracks and defects such as inclusions is greatly increased according to the increase in the strength of the spring wire. Therefore, such a spring wire is more likely to break during cold spring forming (coiling) and for brittle fracture to occur while in use. In a coil spring after it is coiled, tensile residual stress is generated in a direction in which external compressive force is applied during the coiling, and compressive residual stress is generated in a direction in which external tensile stress is applied during the coiling. Therefore, a spring wire with higher tensile strength tends to have these residual stresses at greater values. In addition, when a coil spring is compressively deformed, highest tensile stress is applied on a surface at an inner diameter side of the coil spring. Therefore, when a cold-formed coil spring is compressively deformed, high tensile stress is applied on the inner diameter side of the coil spring in addition to the tensile residual stress that is generated after it is coiled. Accordingly, the inner diameter side of the coil spring is likely to decrease of fatigue strength.

In order to correspond to this, high compressive residual stress may be provided on a surface layer of a spring wire from a surface to deep inside the spring wire. For example, shot peening is widely used for providing compressive residual stress on a surface layer of a spring wire in order to improve the fatigue resistance of a spring. By increasing the compressive residual stress at the surface layer by shot peening, breakage originating from the surface at an early time may be prevented. However, since the yield strength is increased according to increase in the hardness of a spring wire, the amount of plastic strain that can be provided on the surface layer by the shot peening is decreased, and a thick compressive residual stress layer becomes difficult to form. The thickness of the compressive residual stress layer is a distance from the surface to a position where the compressive residual stress is zero. On the other hand, according to the increase in design stress, combined stress of applied stress and residual stress (net stress applied to an inside of a spring wire) reaches a maximum at around a depth of 200 to 600 μm from the surface. This depth from the surface in a radial direction depends on the diameter of the spring wire, the degree of the applied stress, and the like. If inclusions with sizes of approximately 20 μm exist within this area, stress concentrates on the inclusions. The concentrated stress may exceed the fatigue strength of the spring wire and make the inclusions starting points of breakage. Accordingly, the following techniques were disclosed in order to solve these problems.

International Laid Open No. WO2005/081586 and Japanese Unexamined Patent Application Laid-open No. 2008-115468 disclose a method for induction heating a coiled member. However, these references are silent about characteristics such as material strength and metallic structure after induction heating, and effect of the induction heating is unknown.

A spring with superior fatigue resistance is disclosed in Japanese Unexamined Patent Application Laid-open No. 64-83644. This spring is produced by using an oil tempered wire rod in which an element such as V is added in the chemical composition of the steel that is specified in the JIS. The additional element increases toughness of the steel material by refining crystal grains and thereby improves the fatigue resistance; however, this increases the material cost.

A spring made of a silicon killed steel wire with superior fatigue characteristics is disclosed in Japanese Unexamined Patent Application Laid-open No. 2008-163423. The spring is obtained by coiling a steel material in which the amounts of Ba, Al, Si, Mg, and Ca are adjusted. In order to add these elements in balanced amounts, the process of steel refining is very difficult to control, whereby the production cost is high.

A spring with superior fatigue strength is disclosed in Japanese Unexamined Patent Application Laid-open No. 2005-120479. In this spring, the chemical composition of the steel is adjusted, and grain size is decreased while the size of inclusions is decreased because the inclusions may become starting points of fatigue failure. In this spring, the fatigue strength is increased, but the degree of the fatigue strength (maximum shear stress $\tau$ max=approximately 1200 MPa) is lower than a practical strength ($\tau$ max=approximately 1300 to 1400 MPa). The practical strength is required of lightweight and high strength valve springs of recent years. In addition, a method of further performing a nitriding treatment for obtaining higher fatigue strength is disclosed in Japanese Unexamined Patent Application Laid-open No. 2005-120479. The nitriding treatment can increase the surface hardness, whereby the fatigue resistance may be improved. In this method, iron nitrides are formed on a surface layer and must be completely removed after the nitriding treatment, because the iron nitrides may cause decrease in the fatigue strength. Therefore, the production process is complicated, and the cost of the nitriding treatment is high, whereby the production cost is high.

A spring steel wire with superior cold formability and high fatigue strength is disclosed in Japanese Unexamined Patent Application Laid-open No. 2-57637. This spring steel wire is obtained by adding Mo, V, and the like, to a chemical composition of a spring steel that is specified in the JIS and by austempering treatment. In this technique, the yield ratio (ratio of yield strength to tensile strength) is set to be not more than 0.85 in order to decrease tensile residual stress that may remain at the inner diameter side of a coil spring after the spring steel wire is cold formed. However, even when a spring wire with a yield ratio of not more than 0.85 is cold coiled and is then annealed, it is difficult to sufficiently decrease the tensile residual stress, which is generated after the cold coiling, from the surface to the inside. Therefore, even by subsequently performing shot peening, it is difficult to provide compressive residual stress from the surface to the deep inside, whereby improvement in fatigue resistance is limited.

DISCLOSURE OF THE INVENTION

An object of the present invention is to provide a spring with superior fatigue resistance and a production method therefor. The spring is produced by decreasing the material cost in a simplified process.

The inventors of the present invention conducted intensive research on fatigue strength of a valve spring with high strength. As a result, the inventors of the present invention had the following idea. That is, residual stress generated after coiling can be reduced by annealing as the treatment temperature is high. On the other hand, the material is softened through annealing and there is limitation for increase of anneal softening resistance. Therefore, it is naturally difficult to remove tensile residual stress while maintaining high strength of springs. Thus, the inventors of the present invention have found the following effective method. That is, a spring is heated to a high temperature of an austenitizing temperature after cold coiling, so that residual stress generated by the coiling is decreased to be substantially zero, after this, the structure is improved. The spring which is heated to an austenitizing temperature is rapidly cooled down to around room temperature, thereby obtaining a hard martensitic structure. Then, tempering with special conditions is performed, thereby obtaining a tempered martensitic structure which is well-balanced in strength and ductility. Then, shot peening is performed, thereby forming a high compressive residual stress layer which is formed from a surface to deep inside, thereby improving fatigue resistance.

Moreover, the inventors of the present invention found the following. That is, by performing strain aging in which a spring is heated with special conditions and performing setting in which permanent strain is provided to the spring, permanent set generated during practical use as a spring is reduced, whereby sag resistance is improved. A coil spring, in which high compressive residual stress layer is provided from a surface to deep inside, may be made of an inexpensive material such as an oil tempered wire that is specified in the JIS, a hard-drawn wire having the same composition as that of the oil tempered wire, and an annealed wire, or the like. In addition, the coil spring having superior fatigue resistance is produced by performing ordinary shot peening, strain aging, and setting in a later step without a special complicated heat treatment step as long as an appropriate heat history condition is selected so as to form a predetermined structure and predetermined concentrations of alloying elements are set. Moreover, the coil spring has high fatigue resistance corresponding to the requirements of the markets even when a nitriding treatment is not performed, whereas the nitriding treatment is usually performed. Accordingly, the processing cost is decreased, and the process is simplified.

The present invention provides a spring comprising: a composition consisting of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities; a structure including not less than 95% of tempered martensitic structure by area ratio in a cross section of a wire material; a compressive residual stress layer formed from a surface to a depth of 0.35 mm to D/4, in which D (mm) is a circle-equivalent diameter of a cross section, the compressive residual stress layer having maximum compressive residual stress of 800 to 2000 MPa; a center portion with Vickers hardness of 550 to 700 HV in the cross section; and a high hardness layer with greater hardness than the center portion by 50 to 500 HV from a surface to a depth of 0.05 to 0.3 mm. The circle-equivalent diameter of the cross section of the wire material is preferably 1.5 to 15 mm.

The spring according to the present invention is preferably a coiled spring. The present invention can be applied to a stabilizer, a plate spring, a tension rod, and a disk spring.

The present invention also provides a production method for a spring, the method comprising: a step of preparing a steel material consisting of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities; and the following steps performed in order; a step of forming the steel material into a shape of a spring; a hardening step for heating the spring up to an austenitizing temperature and cooling the same to room temperature; tempering step for heating the spring and cooling the same to room temperature; a first shot peening step for projecting shots to the spring; a strain aging step for heating the spring and cooling the same; and a setting step of providing permanent strain to the spring.

According to the present invention, a spring with superior fatigue resistance is obtained without performing a complicated heat treatment and a surface hardening treatment by using a spring wire which is easily available. The spring wire does not contain expensive alloying elements and has a composition of a spring steel that is specified in the JIS. The spring has a high hardness layer and a thick high compressive residual stress layer on a surface layer. The spring of the present invention has superior recycling efficiency because the amounts of the alloying elements are small. In addition, according to the spring of the present invention, the production process is simple, and processing time is decreased, whereby productivity is improved and energy is saved.

Reasons for limiting chemical composition of a steel that is used in the present invention will be described. The symbol "%" represents "mass %" in the following descriptions.

C: 0.5 to 0.7%

C is important for obtaining high strength of not less than 1800 MPa. In order to obtain the effect, it is necessary to add C at not less than 0.5%. On the other hand, if the concentration of C is excessive, ductility is decreased. Therefore, the amount of C is set to be not more than 0.7%. Thus, C is added at 0.5 to 0.7%.

Si: 1.0 to 2.0%

Si has a solid solution strengthening effect and is effective for obtaining high strength. In contrast, if the concentration of Si is excessive, workability of a raw material is greatly lowered and production is difficult. Accordingly, the concentration of Si is set to be not more than 2.0%. Thus, Si is added at 1.0 to 2.0%.

Mn: 0.1 to 1.0%

Mn improves the quenchability of a steel material and added at not less than 0.1% to obtain the ratio of tempered martensite of the present invention. On the other hand, if the concentration of Mn is excessive, segregation occurs, whereby workability is easily decreased. Therefore, the concentration of Mn is set to be not more than 1.0%. Thus, Mn is added at 0.1 to 1.0%.

Cr: 0.1 to 1.0%.

Cr improves the quenchability of a steel material and facilitates strengthening, and is added at not less than 0.1%. On the other hand, if Cr is added at more than 1.0%, iron carbides are easily generated, and the ductility lowered. Accordingly, the concentration of Cr is set to be not more than 1.0%. Thus, Cr is added at 0.1 to 1.0%.

P, S: Not More than 0.035%

P and S facilitate grain-boundary fracture by grain-boundary segregation. Therefore, the concentrations of P and S are desirably lower, and they are impurities, the upper limits of the concentrations of P and S are set to be 0.035%. The concentrations of P and S are preferably not more than 0.01%.

Next, the reason for limiting area ratio of structure will be described.

Tempered Martensite: Not Less than 95%

"Tempered martensite" is defined as a structure which is obtained by heating a material to an austenitizing temperature, rapidly cooling the material and obtaining a martensitic structure, then, heating (tempering) the material and decomposing the material into ferrite and iron carbides. Martensite contains C as austenitic C in a supersaturated solid solution, and has very high hardness and low ductility. Therefore, martensite is subjected to tempering and discharged suitable amount of C while precipitating iron carbides, thereby improving ductility. According to the present invention, a tempered martensitic structure having high strength and high ductility, and the area ratio is required to be not less than 95% to obtain superior fatigue resistance. If the area ratio of the tempered martensitic structure is less than 95%, soft residual austenite, ferrite, pearlite are largely contained, whereby the fatigue resistance is lowered.

Next, reasons for limiting various characteristics in a cross section of a spring wire will be described. It should be noted that "cross section" is a section perpendicular to the longitudinal direction of a wire material of a spring.

Compressive Residual Stress Layer

Compressive residual stress is provided on a surface layer primarily by shot peening. In the present invention, the thickness of the compressive residual stress layer on the surface layer from a surface is set to be 0.35 mm to D/4. The area from a surface to a depth of 200 μm to approximately D/4 tends to become a starting point of fatigue failure due to combined stress of residual stress and stress that is applied by an external load when a spring wire has a diameter in the present invention. Therefore, less than 0.35 mm of the thickness of the compressive residual stress layer is insufficient for preventing fatigue failure that originates from the inside. On the other hand, if the compressive residual stress layer is too thick, tensile residual stress is greatly increased in order to balance stress in the entirety of the steel material. The tensile residual stress exists at an area that is deeper than a depth (crossing point) at which the compressive residual stress is zero. The tensile residual stress is combined with the tensile stress, which is generated in the spring wire by an external load, and facilitates generation of cracks. Therefore, the upper limit of the thickness of the compressive residual stress layer is set to be D/4.

The compressive residual stress layer is made so as to have maximum compressive residual stress of 800 to 2000 MPa. The maximum compressive residual stress is desirably higher in order to prevent generation and growth of fatigue cracks, and not less than 800 MPa of the maximum compressive residual stress is necessary in consideration of using the spring by setting high design stress. On the other hand, if the maximum compressive residual stress on the surface layer is too high, the tensile residual stress in the area that is deeper than the crossing point, which is generated for balancing the stress, may cause internal fracture, as described above. Accordingly, the upper limit of the maximum compressive residual stress is set to be 2000 MPa.

High Hardness Layer

In order to obtain necessary strength that is sufficient to withstand a load as a spring, not less than 550 HV of Vickers hardness is necessary at the center (center of gravity) of a cross section of a spring wire. On the other hand, if the hardness it too high, in general, the elongation is decreased, and notch (crack) sensitivity of the steel material is increased, whereby the fatigue strength may be decreased. Therefore, the hardness at the center of a cross section of a spring wire is set to be not more than 700 HV. A high hardness layer on the surface layer of the spring is effective for preventing generation of cracks and needs to have greater Vickers hardness than the center by not less than 50 HV. On the other hand, if the hardness of the high hardness layer is too high, the high hardness layer is embrittled. Therefore, the upper limit of the difference in the hardness between the high hardness layer and the center is set to be not more than 500 HV. In addition, not less than 0.05 mm of the thickness of the high hardness layer is necessary in order to prevent generation of cracks. On the other hand, if the high hardness layer is too thick, the toughness of the steel material is decreased. Therefore, the thickness of the high hardness layer is set to be not more than 0.3 mm.

A production method for a spring of the present invention will be described.

Forming Step

The forming step is a step for forming a steel material into a predetermined shape, and is preferably coiling. Temperature of a wire material is not limited. In order to inhibit production cost, ordinary cold forming is preferable. The forming may be performed by using a spring forming machine (coiling machine) or by using a cored bar.

Seating Surface Grinding Step

This step is performed as necessary. In this step, both end surfaces of the coiled steel material are ground so as to be flat surfaces that are perpendicular to an axis thereof.

Hardening Step

In the hardening step, the austenitizing temperature is preferably set at a temperature of Ac3 point to (Ac3 point+250° C.) and the cooling rate to room temperature is preferably 20° C./second. Austenitizing must be performed at a temperature of Ac3 point to (Ac3 point+250° C.), and the residual stress generated in the coiling can be substantially zero. Therefore, the austenitizing temperature is very important controlling factor for a production method for realizing the spring in the present invention. If the austenitizing temperature is lower than Ac3 point, the material is not austenitized (tempered martensite is not obtained inevitably), and a predetermined structure is not obtained. On the other hand, if the austenitizing temperature exceeds (Ac3 point+250° C.), diameters of prior austenite grains tend to be increased, whereby the ductility may be decreased. Coarse prior austenite grains may cause decrease of fatigue resistance. Therefore, average diameter of the prior austenite grains after hardening step is preferably 20 μm or less.

The rate of cooling down the coiled steel material to room temperature after the austenitizing is desirably higher to stably obtain martensite, and the cooling needs to be performed at a cooling rate of not less than 20° C./second, preferably, not less than 50° C./second. If the cooling rate is less than 20° C./second, ferrite and pearlite are largely generated during the cooling, and the structure that is described in the present invention is not obtained.

Tempering Step

Since a martensitic structure obtained by the hardening step is greatly low in ductility and toughness, the material is reheated and cooled down to room temperature to obtain well-balanced in strength, ductility and toughness. In the tempering step, the material is preferably heated at a temperature of 330 to 480° C. for 20 minutes or more. These are very important controlling factor for a production method for realizing the spring in the present invention. If the heating temperature is less than 330° C., decomposing of martensite into ferrite and iron carbides is not sufficient, and toughness of the martensite is hardly improved. On the other hand, if the heating temperature is more than 480° C., the iron carbides are promoted to be coarse, whereby strength for bearing required load as a spring cannot be obtained. If the heating time is less than 20 minutes, the decomposing of martensite is not sufficient, whereby ductility and toughness are not sufficient. It should be noted that even if the heating time is more than 60 minutes, the balance of strength, ductility and toughness hardly changes. Therefore, the heating time is preferably 60 minutes or less with consideration of production efficiency and production cost.

First Shot Peening Step

The first shot peening is a method of providing compressive residual stress on a surface of a spring material by colliding a shot of metal or sand on the spring, whereby the fatigue resistance of the spring are greatly improved. In the present invention, the residual stress generated in the forming step reduced to substantially zero by the hardening step, and compressive residual stress can be provided on a surface layer of a spring wire from a surface to deep inside the spring wire. Therefore, the shot peening step is important step to obtain required compressive residual stress.

In the first shot peening step, the shots preferably has a sphere-equivalent diameter of 0.6 to 1.2 mm, and the shots are preferably projected at a speed of 60 to 100 m/second so as to cause coverage of 100% or more. If the sphere-equivalent diameter of the shots is less than 0.6 mm, since the projecting energy is small, required compressive residual stress cannot be obtained. On the other hand, if the sphere-equivalent diameter of the shots is more than 1.2 mm, since the projecting energy is too large, the surface roughness of a surface of a spring is disadvantageously large and cracks easily formed on a surface of a spring. If the projecting speed is out the range of 60 to 100 m/second, it is disadvantageous because the reason as in the sphere-equivalent diameter of the shots. If the coverage is less than 100%, tensile stress is remained at a portion to which the shots did not collide, and the portion causes decrease of fatigue resistance of the spring.

It should be noted that the shot peening can be repeated several times. In this case, the sphere-equivalent diameter of the shots used in the prior shot peening is preferably larger than that of the shots used in the later shot peening. By such a manner, the surface roughness which was increased by the prior shot peening can be reduced by the later shot peening.

The shot peening may be performed by using a shot of cut wires, steel balls, high hardness particles such as of the FeCrB type, or the like. The degree of the compressive residual stress can be adjusted by a sphere-equivalent diameter of the shot, shooting speed, shooting time, and a multistep shooting process.

Strain Aging Step

Strain provided in a wire material in the shot peening step includes a large amount of dislocation. It is known that permanent set is caused by movement of the dislocation. Permanent set of a spring causes some disadvantages such that the spring cannot bear predetermined load. Therefore, in order to inhibit movement of dislocation, a spring is heated (strain aging). It is known that solid solution atoms such as C move around a dislocation by strain aging, whereby the dislocation is fixed and amount of permanent set is decreased.

In the strain aging step of the present invention, a spring is preferably heated at a temperature of 150 to 300° C. for 10 minutes or more. If the heating temperature is less than 150° C., movement of C is not sufficient and the dislocation is not sufficiently fixed, and amount of permanent set is large. If the heating temperature is more than 300° C., the compressive residual stress obtained by the shot peening is decreased, and fatigue resistance is decreased. If the heating time is less than 10 minutes, movement of C is not sufficient and the dislocation is not sufficiently fixed, and amount of permanent set is large. Even if the heating time is more than 60 minutes, effect of fixing dislocation is saturated. Therefore, the heating time is preferably 60 minutes for production efficiency and cost.

Setting Step

The setting step is performed by providing plastic strain to a material so as to improve the elastic limit and to decrease the amount of amount of permanent set (sag). In the setting step, the spring is preferably heated at a temperature of 150 to 300° C. and share strain of 0.015 to 0.022 is generated on a surface of the wire material. The setting step is performed for obtaining the same effect of the strain aging step. The setting is performed at the same temperature (150 to 300° C.) in the strain aging, whereby sag resistance is further improved. If the share strain generated on a surface of the wire material is less than 0.015 in the setting, plastic strain is small, and permanent set is large. If the share strain is more than 0.022, a pre-crack is formed on a surface of the wire material, the crack extends while the spring is used, the spring may be broken within shortened service life.

Second Shot Peening Step

It is preferable to perform a second shot peening step for projecting shots again after the setting step. The shots in the second shot peening step preferably has a sphere-equivalent diameter which is smaller than that of the shots used in the first shot peening step. This step is optionally performed. Since the shots having smaller sphere-equivalent diameter than that in the in the first shot peening is used in the second shot peening step, the compressive residual stress on a surface of a wire spring material is increased and the surface roughness is reduced, whereby the fatigue resistance is improved. Since the strain provided in the wire material is restricted within a greatly thin layer in a surface, amount of permanent set in the production process is very small and substantially rise no problem.

According to the present invention, material cost can be reduced and production process can be simple, and a spring having superior fatigue resistance can be obtained.

BRIEF DESCRIPTION OF DRAWINGS

FIG. 1 shows an example of a production process of a spring according to the present invention.

BEST MODE FOR CARRYING OUT THE INVENTION

The present invention will be explained in detail. FIG. 1 shows an example of a production process of a spring according to the present invention. An oil tempered wire consisting of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities is prepared. The wire is cold coiled into a predetermined shape using a coiling machine (coiling step), after austenitizing at a temperature of Ac3 point to (Ac3 point+250° C.), the spring is cooled down to room temperature at a cooling rate of not less than 20° C./second (hardening step). The residual stress generated in the coiling can be substantially zero by this step. Since the spring is rapidly cooled after austenitizing, a martensitic structure can be obtained while inhibiting generation of large amount of ferrite and pearlite.

Next, the spring is heated at a temperature of 330 to 480° C. for 20 minutes or more, and is cooled down to room temperature (tempering step). By this step, the martensite decomposes into ferrite and iron carbides, whereby a structure (tempered martensite) which is well-balanced in strength, ductility and toughness.

Then, shot peening (first shot peening) composed of a first step using a round cut wire and a second step using a round cut wire with smaller sphere-equivalent diameter than that in the first step is performed. In the first shot peening step, the shots has a sphere-equivalent diameter of 0.6 to 1.2 mm, and the shots are projected at a speed of 60 to 100 m/second so as to cause coverage of 100% or more. In the hardening step, the residual stress generated in the coiling is removed to be substantially zero. In the shot peening step, high compressive residual stress is provided on a surface layer of a spring wire from a surface to deep inside the spring wire. Therefore, the fatigue resistance is greatly improved by the shot peening.

Next, the spring is heated at a temperature of 150 to 300° C. for 10 minutes or more, and is cooled (strain aging). In the shot peening step, strain is provided in a spring wire, the strain includes a large amount of dislocation. Therefore, in the strain aging step, the spring is heated and solid solution elements such as C are moved around the dislocation, thereby fixing the dislocation. Therefore, movement of the dislocation is inhibited.

Furthermore, the spring is heated at a temperature of 150 to 300° C. and permanent set is provided to the spring so that share strain of 0.015 to 0.022 is generated on a surface of the spring (setting step). In this step, the elastic limit is improved by providing plastic strain, and amount of permanent set is reduced. Furthermore, as a third step of shot peening, shot peening (second shot peening) using sand particles with a smaller sphere-equivalent diameter than that in the second step is performed.

The spring according to the present invention produced by the above steps has a structure including not less than 95% of tempered martensitic structure by area ratio in a cross section of a wire material, a compressive residual stress layer formed from a surface to a depth of 035 mm to D/4, in which D (mm) is a circle-equivalent diameter of a cross section, the compressive residual stress layer having maximum compressive residual stress of 800 to 2000 MPa, a center portion with Vickers hardness of 550 to 700 HV in the cross section, and a high hardness layer with greater hardness than the center portion by 50 to 500 HV from a surface to a depth of 0.05 to 0.3 mm. Therefore, the spring in the present invention has a high-strength layer and a high-compressive residual stress layer in a surface layer, and has superior fatigue resistance.

EXAMPLES

Springs were produced according to the steps shown in FIG. 1. That is, an oil tempered wire (SWOSC-V) having a composition shown in Table 1 was prepared and was cold coiled into a predetermined shape by a coiling machine, whereby springs shown in Table 2 were obtained. The springs were subjected to a heat treatment at a condition shown in Table 3. Next, the springs were subjected to shot peening. In the shot peening, round cut wires with a sphere-equivalent diameter of 0.8 mm were used in a first step. Then, round cut wires with a sphere-equivalent diameter of 0.45 mm were used in a second step. Moreover, the springs were heated to 230° C. for 10 minutes for strain aging and were cooled down to room temperature. Then, the springs were subjected to cold setting corresponding to maximum shear strain of 0.020 (maximum shear stress of $\tau=1565$ MPa, and modules of rigidity of 78.5 GPa). Various characteristics of the springs were investigated in the following manner with respect to the springs, and results thereof are shown in Table 3. In Table 3, values which do not fulfill the conditions recited by the present invention are underlined.

TABLE 1

| Steel type | Chemical composition (mass %) Balance is iron and inevitable impurities | | | | | | |
|---|---|---|---|---|---|---|---|
| | C | Si | Mn | Cr | P | S | Ac3 (° C.) |
| SWOSC-V | 0.57 | 1.42 | 0.66 | 0.67 | 0.01 | 0.008 | 806 |

TABLE 2

| Steel type | SWOSC-V |
|---|---|
| Wire diameter | 4.1 mm |
| Average coil diameter | 24.6 mm |
| Total coils | 5.75 |
| Active coils | 3.25 |
| Coiling direction | Right-handed coiling |
| Free height | 42.8 mm |
| Spring constant | 57.3 N/mm |

TABLE 3

| No. | Austenitizing temperature (° C.) | Tempering temperature (° C.) | Tempering time (minute) | Area ratio of tempered martensite (%) | Maximum compressive residual stress (MPa) | Thickness of compressive residual stress layer (mm) | Hardness at center portion (HV) | Thickness of high hardness layer (mm) | Fatigue resistance | Notes |
|---|---|---|---|---|---|---|---|---|---|---|
| 1 | 850 | 500 | 60 | 100 | 610 | 0.5 | 407 | 0.21 | Bad | Comparative example |
| 3 | 850 | 400 | 60 | 99 | 1119 | 0.45 | 673 | 0.13 | Good | Practical example |
| 4 | 850 | 350 | 60 | 98 | 1153 | 0.36 | 692 | 0.09 | Good | Practical example |
| 5 | 850 | 300 | 60 | 92 | 1170 | 0.3 | 725 | 0.04 | Bad | Comparative example |

Note:
The underline indicates that the value does not satisfy the condition described in the present invention.

Area Ratio of Tempered Martensite

A sample was buff finished and immersed in a nital (a solution of 3% nitric acid and alcohol) for a few seconds. The structure is observed by a light microscope. The pattern (gray portion) looks like aligned linen leaves was deemed to be tempered martensite, and the area ratio was obtained by image procession.

Residual Stress Distribution

Residual stress which was generated in a direction of 45° with respect to the axis of the coiled spring with tensile strain when compressive load was loaded was measured with respect to the inner circumferential surface of the coiled spring by using the X-ray diffraction method. Thus, the maximum compressive residual stress was measured. Then, the entire surface of coiled spring was chemically polished, and the above measurement was performed again. By repeating these steps, a residual stress distribution in a depth direction was obtained.

Vickers Hardness at Center Portion

Vickers hardness was measured at five points around the center portion of a cross section of the spring, and an average thereof was calculated as Vickers hardness at the center portion.

Thickness of High Hardness Layer

Vickers hardness was measured from the outer circumferential surface toward the center of a cross section of the steel material, and a thickness of a high hardness layer, which had greater Vickers hardness than the center by 50 to 500 HV, from the surface was measured.

Fatigue Resistance

A fatigue test was performed at average stress $\tau$ m of 735 MPa and stress amplitude $\tau$ a of 637 MPa. The sample that resisted more than $1\times10^7$ times was determined to have superior fatigue resistance and is represented by "Good" in Table 3. The sample that broke before $1\times10^7$ times was performed was determined to have inferior fatigue resistance and is represented by "Bad" in Table 3. The results of investigating various characteristics are shown in Table 3.

The samples Nos. 3 and 4, which satisfied the conditions that are described in the present invention, exhibited superior fatigue resistance. In contrast, the samples No. 1, which did not satisfy the conditions that are described in the present invention, had insufficient fatigue resistance because the sample did not satisfy the following conditions. That is, in sample No. 1, the temperature in tempering was too high, whereby the average hardness in the center portion was low, and the maximum compressive residual stress was low. Therefore sample No. 1 was low in the fatigue resistance. In sample No. 5, the temperature in tempering was too low, whereby the rate of tempered martensite was low, the maximum compressive residual stress in the center portion was too high, and thickness of the high-strength layer and thickness of the compressive residual stress layer in the surface layer were small. Therefore, sample No. 5 was low in the fatigue resistance. Thus, it was confirmed that by performing heat treatment with suitable temperature, a spring in which 95% or more in area ratio of martensite with well-balanced in strength and ductility and fatigue resistance was superior.

The invention claimed is:

1. A spring comprising:
    a composition consisting of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities;
    a structure including not less than 95% of tempered martensitic structure by area ratio in a cross section of a wire material;
    a compressive residual stress layer formed from a surface to a depth of 0.35 mm to D/4, in which D (mm) is a circle-equivalent diameter of a cross section, the compressive residual stress layer having maximum compressive residual stress of 800 to 2000 MPa;
    a center portion with Vickers hardness of 550 to 700 HV in the cross section; and
    a high hardness layer with greater hardness than the center portion by 50 to 500 HV from a surface to a depth of 0.05 to 0.3 mm.

2. The spring according to claim 1, wherein the circle-equivalent diameter of the cross section of the wire material is 1.5 to 15 mm.

3. The spring according to claim 1, wherein the spring is a coiled spring.

4. A production method for a spring, the method comprising:
    a step of preparing a steel material consisting of, by mass %, 0.5 to 0.7% of C, 1.0 to 2.0% of Si, 0.1 to 1.0% of Mn, 0.1 to 1.0% of Cr, not more than 0.035% of P, not more than 0.035% of S, and the balance of Fe and inevitable impurities; and the following steps performed in order;
    a step of forming the steel material into a shape of a spring;
    a hardening step for heating the spring up to an austenitizing temperature and cooling down the same to room temperature;
    tempering step for heating the spring and cooling the same to room temperature;
    a first shot peening step for projecting shots to the spring;
    a strain aging step for heating the spring and cooling the same; and
    a setting step of providing permanent strain to the spring.

5. The production method for the spring according to claim 4, wherein the forming step is coiling.

6. The production method for the spring according to claim 4, wherein in the hardening step, the austenitizing temperature is Ac3 point to (Ac3 point+250° C.) and is cooled at a cooling rate of not less than 20° C./second.

7. The production method for the spring according to claim 4, wherein in the tempering step, the spring is heated at a temperature of 330 to 480° C. for not less than 20 minutes.

8. The production method for the spring according to claim 4, wherein the shots has a sphere-equivalent diameter of 0.6 to 1.2 mm, the shots are projected at a speed of 60 to 100 m/s so as to cause coverage of 100% or more.

9. The production method for the spring according to claim 4, wherein in the strain aging step, the spring is heated at a temperature of 150 to 300° C. for 10 minutes or more.

10. The production method for the spring according to claim 4, wherein in the setting step, the spring is heated at a temperature of 150 to 300° C. and share strain of 0.015 to 0.022 is generated on a surface of the wire material.

11. The production method for the spring according to claim 4, wherein the method further comprises a second shot peening step for projecting shots to the spring after the setting step, the shots has a sphere-equivalent diameter which is smaller than that of the shots used in the first shot peening step.

* * * * *